United States Patent
Suizu et al.

(10) Patent No.: US 7,679,662 B2
(45) Date of Patent: Mar. 16, 2010

(54) SOLID-STATE IMAGING ELEMENT AND SOLID-STATE IMAGING DEVICE

(75) Inventors: Sadamu Suizu, Fukuoka (JP); Masaaki Takayama, Fukuoka (JP)

(73) Assignee: Sony Corporation, Tokyo (JP)

( * ) Notice: Subject to any disclaimer, the term of this patent is extended or adjusted under 35 U.S.C. 154(b) by 642 days.

(21) Appl. No.: 11/558,227

(22) Filed: Nov. 9, 2006

(65) Prior Publication Data

US 2007/0115381 A1    May 24, 2007

(30) Foreign Application Priority Data

Nov. 11, 2005    (JP)    ............................ P2005-327587

(51) Int. Cl.
*H04N 5/335* (2006.01)
(52) U.S. Cl. .................. 348/294; 348/311; 348/312; 348/315; 348/316; 348/282; 348/283; 250/208.1; 257/428; 257/429; 257/430; 257/431; 257/432; 257/433; 257/434; 257/435; 257/436; 257/437; 257/438; 257/439; 257/440; 257/441; 257/442; 257/443; 257/444; 257/445; 257/446; 257/447; 257/448; 257/449; 257/450; 257/451; 257/452; 257/453; 257/454; 257/455; 257/456; 257/457; 257/458; 257/459; 257/460; 257/461; 257/462; 257/463; 257/464; 257/465; 257/466
(58) Field of Classification Search .................. 348/312, 348/311, 315, 294, 316, 282, 283; 257/231, 257/428–466; 250/208.1
See application file for complete search history.

(56) References Cited

U.S. PATENT DOCUMENTS

| 5,194,751 A | * | 3/1993 | Yonemoto et al. | ............ 257/229 |
| 2007/0085922 A1 | * | 4/2007 | Kido | .......................... 348/311 |

FOREIGN PATENT DOCUMENTS

| JP | 04-174559 | 6/1992 |
| JP | 09-326481 | 12/1997 |
| JP | 11-040795 | 2/1999 |
| JP | 2000-174248 | 6/2000 |
| JP | 2002-076319 | 3/2002 |

OTHER PUBLICATIONS

Japanese Patent Office Action corresponding to Japanese Serial No. 2005-327587 dated Oct. 20, 2009.

* cited by examiner

*Primary Examiner*—Jason Chan
*Assistant Examiner*—Yih-Sien Kao
(74) *Attorney, Agent, or Firm*—Sonnenschein Nath & Rosenthal LLP

(57) ABSTRACT

Disclosed herein is a solid-state imaging element which includes a plurality of drive signal inputs, a plurality of bus lines, and a plurality of vertical transfer register electrodes. In the solid-state imaging element, a charge accumulated in light-receiving elements in a pixel region is vertically transferred by the drive signals input to the electrodes. Each of the electrodes has a contact part connected to the second contact and having a width smaller than a width of the electrodes in the pixel region, and a blank region is formed between predetermined adjacent two of the contact parts so that a width of the blank region is larger than a distance between respective two of the contact parts other than the predetermined adjacent two of the contact parts. The first contact is disposed on the blank region.

5 Claims, 6 Drawing Sheets

US 7,679,662 B2

SOLID-STATE IMAGING ELEMENT AND SOLID-STATE IMAGING DEVICE

CROSS REFERENCES TO RELATED APPLICATIONS

The present invention contains subject matter related to Japanese Patent Application JP 2005-327587 filed in the Japanese Patent Office on Nov. 11, 2005, the entire contents of which being incorporated herein by reference.

BACKGROUND OF THE INVENTION

1. Field of the Invention

The present invention relates to a solid-state imaging element and a solid-state imaging device, and particularly has an improved characteristic in an arrangement for connecting electrodes of vertical transfer registers in a solid-state imaging element to bus lines for inputting predetermined drive signals to the respective electrodes.

2. Description of the Related Art

An existing charge-coupled device (CCD) solid-state imaging element used in a solid-state imaging device includes, on a semiconductor substrate, plural light-receiving elements arranged vertically and horizontally, plural vertical transfer registers provided adjacent to these light-receiving elements, and a horizontal transfer register provided along one side of the rectangular pixel region in which these vertical transfer registers and light-receiving elements are provided.

Charges that are accumulated in the respective light-receiving elements in response to light reception thereof are read out by the vertical transfer registers so as to be vertically transferred through the vertical transfer registers to the horizontal transfer register, followed by being horizontally transferred by the horizontal transfer register. The transferred charges are converted into an electric signal (voltage signal, in many cases) and amplified in an output part provided downstream of the horizontal transfer register, so that a requisite image signal is produced and output.

Specifically, as schematically shown in FIG. 6, vertical transfer registers 120 are provided in such a manner as to be adjacent to light-receiving elements 110 arranged vertically and horizontally in a pixel region 100 and be extended in the upward and downward directions in FIG. 6. Furthermore, a horizontal transfer register 130 is provided in such a manner as to be connected to ends of the vertical transfer registers 120 and be extended in the left and right directions in FIG. 6.

In general, the vertical transfer registers 120 are driven by four-phase vertical drive signals $V\phi1, V\phi2, V\phi3$, and $V\phi4$. In the pixel region 100, vertical transfer electrodes 210 that are extended in the lateral direction and are supplied with the respective vertical drive signals $V\phi1, V\phi2, V\phi3$, and $V\phi4$ are arranged continuously across the vertical direction. Furthermore, necessary bus lines 150 provided outside the pixel region 100 are connected to the respective vertical transfer electrodes 210, and the vertical drive signals $V\phi1, V\phi2, V\phi3$, and $V\phi4$ are input to the respective vertical transfer electrodes 210 via the bus lines 150.

In addition, the horizontal transfer register 130 is driven by two-phase horizontal drive signals $H\phi1$ and $H\phi2$ in general. Across the horizontal transfer register 130, horizontal transfer electrodes 310 to which the respective horizontal drive signals $H\phi1$ and $H\phi2$ are input are continuously arranged. Furthermore, necessary bus lines 150' provided outside the pixel region 100 are connected to the respective horizontal transfer electrodes 310, and the horizontal drive signals $H\phi1$ and $H\phi2$ are input to the horizontal transfer electrodes 310 via the bus lines 150'.

Due to input of the vertical drive signals $V\phi1, V\phi2, V\phi3$, and $V\phi4$ to the respective vertical transfer electrodes 210 and input of the horizontal drive signals $H\phi1$ and $H\phi2$ to the respective horizontal transfer electrodes 310, potentials for forwarding the charges in a bucket brigade manner are formed in the vertical transfer registers 120 and the horizontal transfer register 130, and thereby the charges accumulated in the respective light-receiving elements 110 can be transferred.

The vertical drive signals $V\phi1, V\phi2, V\phi3$, and $V\phi4$ and the horizontal drive signals $H\phi1$ and $H\phi2$ are produced by a timing generator, and are input to the bus lines 150 and 150' via vertical drive signal inputs 140 and horizontal drive signal inputs 170, respectively, that are formed of signal input terminals of the solid-state imaging element. The number of the vertical drive signal inputs 140 is four because the four-phase vertical drive signals $V\phi1, V\phi2, V\phi3$, and $V\phi4$ are input, while the number of the horizontal drive signal inputs 170 is two because the two-phase horizontal drive signals $H\phi1$ and $H\phi2$ are input.

In such a solid-state imaging element, the vertical transfer electrodes 210 have a comparatively long length because they are formed to traverse the pixel region 100. Therefore, in order to suppress deterioration of the vertical drive signals $V\phi1, V\phi2, V\phi3$, and $V\phi4$, as shown in FIG. 7, both the ends of the vertical transfer electrodes 210 are protruded from the pixel region 100 and connected to the bus lines 150 so that the vertical drive signals $V\phi1, V\phi2, V\phi3$, and $V\phi4$ are input to both the ends. In this configuration, the bus lines 150 are provided in such a manner as to surround the pixel region 100 (e.g., refer to Japanese Patent Laid-Open No. 11-40795).

In recent years, due to requirements for solid-state imaging devices to have higher performance, the number of light-receiving elements 110 provided in a solid-state imaging element has been dramatically increasing. Therefore, the time period it takes for signal charges accumulated in the light-receiving elements 110 to be read out and transferred has been becoming longer than ever before.

To address this, a solid-state imaging element in which two horizontal transfer registers 130 sandwich the pixel region 100 as schematically shown in FIG. 8 has also been devised in order to enhance the speed of reading-out processing.

However, if the horizontal transfer registers 130 are provided on the upper and lower sides of the pixel region 100 as shown in FIG. 8, it is difficult for the bus lines 150 to be wired along the left, upper and right sides of the pixel region 100 so as to surround the pixel region 100 as shown in FIG. 7.

Therefore, in the solid-state imaging element shown in FIG. 8, necessary vertical drive signal inputs 140 are provided near the ends of the vertical transfer electrodes 210 and the vertical drive signals $V\phi1, V\phi2, V\phi3$, and $V\phi4$ are input thereto. In this configuration, it is requisite to ensure, in the bus lines 150, a part for connection to the drive signal inputs 140 in an area other than the area corresponding to the part that is near the pixel region 100 and used for connection to the respective vertical transfer electrodes 210.

To satisfy this requirement, as shown in FIG. 8, fold-back parts are formed in the bus lines 150 so that the bus lines 150 are wired into a loop shape and connected to the drive signal inputs 140.

SUMMARY OF THE INVENTION

However, forming the bus lines into a loop shape leads to a comparatively long wiring length of the bus lines and therefore results in an increased parasitic wiring capacitance and a large wiring resistance. Therefore, there is a possibility that proper drive signals deteriorate, in other words, propagation delay of the drive signals and signal waveform distortion occur and thereby cause transfer errors.

The influence of the propagation delay of the drive signals and so on can be alleviated by increasing the wiring width of the bus lines. However, the width increase leads to an increased parasitic capacitance. Furthermore, the wiring area is increased and thus the chip area of the solid-state imaging element is also increased, which possibly causes a decrease in the maximum number of chips that can be obtained from one wafer and hence an increase in manufacturing costs.

In addition, if the bus lines are formed to have a loop shape, the wiring area is increased correspondingly to the provision of the fold-back parts, which precludes reduction in manufacturing costs.

In view of these problems, the present inventors have conducted research and development to suppress deterioration of drive signals by decreasing the wiring length of bus lines and reduce the size of a solid-state imaging element by decreasing the wiring area of the bus lines. As a result, the present inventors have completed the present invention.

According to a first embodiment of the present invention, there is provided a solid-state imaging element that includes a plurality of drive signal inputs configured to be supplied with a plurality of different drive signals, a plurality of bus lines configured to be coupled to the drive signal inputs via a first contact, and a plurality of vertical transfer register electrodes configured to be coupled to the bus lines via a second contact so as to be supplied with the drive signals. In the solid-state imaging element, a charge accumulated in light-receiving elements in a pixel region is vertically transferred by the drive signals input to the electrodes. Each of the electrodes has a contact part connected to the second contact and having a width smaller than the width of the electrodes in the pixel region, and a blank region is formed between predetermined adjacent two of the contact parts so that the width of the blank region is larger than the distance between respective two of the contact parts other than the predetermined adjacent two of the contact parts. Furthermore, the first contact is disposed on the blank region.

According to a second embodiment of the invention, there is provided a solid-state imaging device including a solid-state imaging element that includes a plurality of drive signal inputs configured to be supplied with a plurality of different drive signals produced by a timing generator, a plurality of bus lines configured to be coupled to the drive signal inputs via a first contact, and a plurality of vertical transfer register electrodes configured to be coupled to the bus lines via a second contact so as to be supplied with the drive signals. In the solid-state imaging element, a charge accumulated in light-receiving elements in a pixel region is vertically transferred by the drive signals input to the electrodes. The bus lines are formed into a straight line shape outside the pixel region. Each of the electrodes has a contact part connected to the second contact and having a width smaller than the width of the electrodes in the pixel region, and a blank region is formed between predetermined adjacent two of the contact parts so that the width of the blank region is larger than the distance between respective two of the contact parts other than the predetermined adjacent two of the contact parts. Furthermore, the first contact is disposed on the blank region.

According to the first embodiment, in a solid-state imaging element that includes a plurality of drive signal inputs supplied with a plurality of different drive signals, a plurality of bus lines coupled to the drive signal inputs via a first contact, and a plurality of vertical transfer register electrodes coupled to the bus lines via a second contact so as to be supplied with the drive signals, and in which a charge accumulated in light-receiving elements in a pixel region is vertically transferred by the drive signals input to the electrodes, each of the electrodes has a contact part connected to the second contact and having a width smaller than the width of the electrodes in the pixel region. In addition, a blank region is formed between predetermined adjacent two of the contact parts so that the width of the blank region is larger than the distance between respective two of the contact parts other than the predetermined adjacent two of the contact parts. Furthermore, the first contact is disposed on the blank region. This configuration eliminates the need to provide fold-back parts in the bus lines and thus allows the bus lines to be formed into a straight line shape. Therefore, a decreased wiring area of the bus lines can be achieved and hence the size of the solid-state imaging element can be reduced. Furthermore, short bus lines can be achieved correspondingly to the absence of the fold-back parts, which can suppress deterioration of the drive signals.

According to the second embodiment, in a solid-state imaging device including a solid-state imaging element that has a plurality of drive signal inputs supplied with a plurality of different drive signals produced by a timing generator, a plurality of bus lines coupled to the drive signal inputs via a first contact, and a plurality of vertical transfer register electrodes coupled to the bus lines via a second contact so as to be supplied with the drive signals, and in which a charge accumulated in light-receiving elements in a pixel region is vertically transferred by the drive signals input to the electrodes, each of the electrodes has a contact part connected to the second contact and having a width smaller than the width of the electrodes in the pixel region. In addition, a blank region is formed between predetermined adjacent two of the contact parts so that the width of the blank region is larger than the distance between respective two of the contact parts other than the predetermined adjacent two of the contact parts. Furthermore, the first contact is disposed on the blank region. Due to this configuration, in the solid-state imaging element, there is no need to provide fold-back parts in the bus lines and thus the bus lines can be formed into a straight line shape. Therefore, a decreased wiring area of the bus lines can be achieved and hence the size of the solid-state imaging element can be reduced. Furthermore, manufacturing costs can be decreased, which can provide a more inexpensive solid-state imaging device.

DETAILED DESCRIPTION OF THE PREFERRED EMBODIMENTS

In a solid-state imaging element and a solid-state imaging device including this solid-state imaging element according to an embodiment of the present invention, drive signals for driving vertical transfer registers in the solid-state imaging element are input from drive signal inputs to the solid-state imaging element. More specifically, the drive signals are input to electrodes for the vertical transfer registers via bus lines connected to the drive signal inputs.

In particular, each electrode is provided with a contact part connected to a second contact. Between the respective predetermined adjacent two of these contact parts, blank regions of which width is larger than the distance between the respective two adjacent contact parts other than the respective predetermined adjacent two of the contact parts. Furthermore, first contacts are disposed on the blank regions.

By thus providing the blank regions for formation of the first contacts thereon between the predetermined contact parts, the need to provide fold-back parts in the bus lines can be eliminated, and the bus lines can be formed into a straight line shape.

Therefore, the wiring area of the bus lines can be decreased correspondingly to the absence of the fold-back parts, which allows size reduction of the solid-state imaging element and a decrease in manufacturing costs. In addition, the bus lines can be shortened correspondingly to the absence of the fold-back parts, and hence deterioration of the drive signals can be suppressed.

Figure 1:
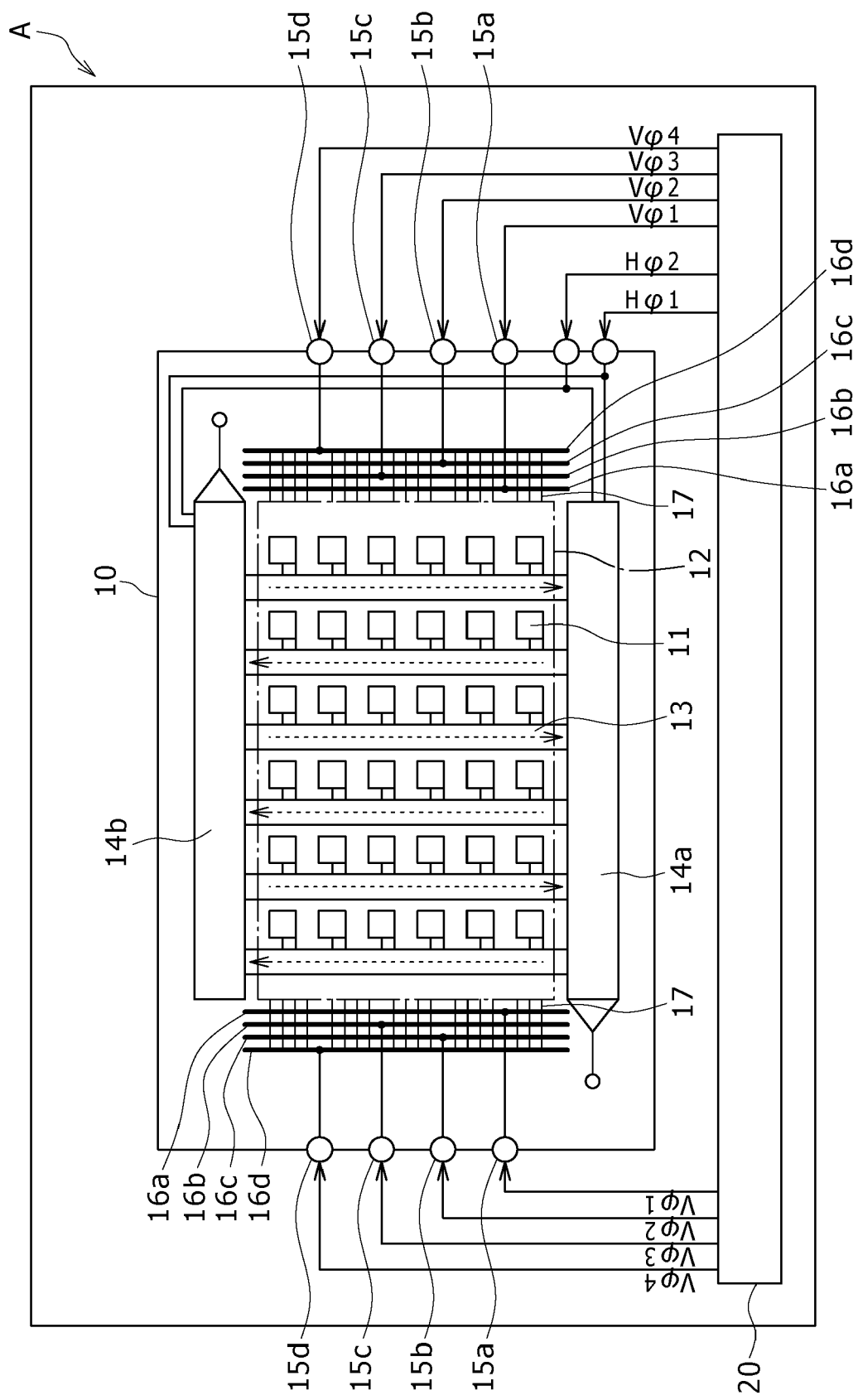
FIG. 1 is a schematic explanatory diagram of a solid-state imaging device according to an embodiment of the present invention.

An embodiment of the invention will be described below in detail based on the drawings. FIG. 1 is a schematic diagram of a solid-state imaging device A of the embodiment. The solid-state imaging device A of the present embodiment is a digital still camera referred to as a so-called digital camera. Note that the solid-state imaging device A is not limited to the digital still camera but may be a digital video camera, a camera unit incorporated into a cell phone, or the like.

FIG. 1 shows a solid-state imaging element 10 used for image capturing by the solid-state imaging device A, and a timing generator 20 that produces drive signals for driving the solid-state imaging element 10 at a predetermined timing. In addition to these components, the solid-state imaging device A includes a power supply unit such as a battery, a storage in which image data signals produced through imaging are stored, a controller that controls the entire solid-state imaging device A, and so on. According to FIG. 1, the circuit constructing these components other than the imaging element 10 and the timing generator 20 is formed as a separate circuit (formed on a chip other than the chip including the solid-state imaging element 10). However, the circuit may be provided on the same chip, or alternatively may be provided on several chips.

The solid-state imaging element 10 is formed of a semiconductor substrate. Provided on the semiconductor substrate is a pixel region 12 in which plural light-receiving elements 11 formed of photodiodes are vertically and horizontally arranged with predetermined distances.

In the pixel region 12, vertical transfer registers 13 are provided adjacent to the light-receiving elements 11. In FIG. 1, the vertical transfer registers 13 are provided along the columns of the light-receiving elements and in parallel to the upward and downward directions so that signal charges accumulated in the light-receiving elements 11 can be read out into the vertical transfer registers 13 and transferred.

Furthermore, on the semiconductor substrate of the solid-state imaging element 10, a first horizontal transfer register 14a and a second horizontal transfer register 14b are provided to sandwich the pixel region 12. The first and second horizontal transfer registers 14a and 14b are extended in the left and right directions in FIG. 1. In the present embodiment, the first horizontal transfer register 14a transfers charges transferred through the vertical transfer registers 13 on the odd-numbered columns from the rightmost column in FIG. 1, while the second horizontal transfer register 14b transfers charges transferred through the vertical transfer registers 13 on the even-numbered columns from the rightmost column in FIG. 1.

In the present embodiment, the first and second horizontal transfer registers 14a and 14b are driven by two-phase horizontal drive signals: a first horizontal drive signal $H\phi 1$ and a second horizontal drive signal $H\phi 2$. The first and second horizontal drive signals $H\phi 1$ and $H\phi 2$ having predetermined waveforms are input from the timing generator 20 to the first and second horizontal transfer registers 14a and 14b.

Furthermore, the vertical transfer registers 13 are driven by four-phase vertical drive signals: a first vertical drive signal $V\phi 1$, a second vertical drive signal $V\phi 2$, a third vertical drive signal $V\phi 3$, and a fourth vertical drive signal $V\phi 4$. The first to fourth vertical drive signals $V\phi 1$ to $V\phi 4$ having predetermined waveforms are input from the timing generator 20 to the vertical transfer registers 13.

In particular, on the solid-state imaging element 10, first drive signal inputs 15a, second drive signal inputs 15b, third drive signal inputs 15c, and fourth drive signal inputs 15d are provided. The first to fourth drive signal inputs 15a to 15d are signal input terminals to which the first to fourth vertical drive signals $V\phi 1$ to $V\phi 4$ are input, respectively.

The first drive signal inputs 15a are connected to first bus lines 16a, and the second drive signal inputs 15b are connected to third bus lines 16c. In addition, the third drive signal inputs 15c are connected to second bus lines 16b, and the fourth drive signal inputs 15d are connected to fourth bus lines 16d. Via these first to fourth bus lines 16a, 16b, 16c and 16d, necessary vertical drive signals are input to requisite vertical transfer electrodes 17.

The vertical transfer electrodes 17, to which the first to fourth vertical drive signals $V\phi 1$, $V\phi 2$, $V\phi 3$, and $V\phi 4$ are input, are disposed to traverse the pixel region 12 with the ends thereof being protruded from the pixel region 12. The protruding part of each vertical transfer electrode 17 serves as a contact part L and is connected to any one of the first to fourth bus lines 16a, 16b, 16c, and 16d so that a requisite vertical drive signal is input to the vertical transfer electrode 17.

In the present embodiment, the ends of the vertical transfer electrodes 17 are protruded as the contact parts L toward both the left and right sides of the pixel region 12 in FIG. 1. Furthermore, the first to fourth vertical drive signals $V\phi 1$, $V\phi 2$, $V\phi 3$, and $V\phi 4$ input from the first to fourth drive signal inputs 15a, 15b, 15c, and 15d provided on the left side of the solid-state imaging element 10 are input to the contact parts L of the vertical transfer electrodes 17 protruded toward the left side of the pixel region 12 via the first to fourth bus lines 16a, 16b, 16c, and 16d. In addition, the first to fourth vertical drive signals $V\phi 1$, $V\phi 2$, $V\phi 3$, and $V\phi 4$ input from the first to fourth drive signal inputs 15a, 15b, 15c, and 15d provided on the right side of the solid-state imaging element 10 are input to the contact parts L of the vertical transfer electrodes 17 protruded toward the right side of the pixel region 12 via the first to fourth bus lines 16a, 16b, 16c, and 16d.

Major part of the embodiment of the invention will be described below in detail. The embodiment of the invention has a characteristic in the wiring pattern for connecting the first to fourth bus lines 16a, 16b, 16c, and 16d to the vertical transfer electrodes 17 and the first to fourth drive signal inputs 15a, 15b, 15c, and 15d in the solid-state imaging element 10.

Figure 2:
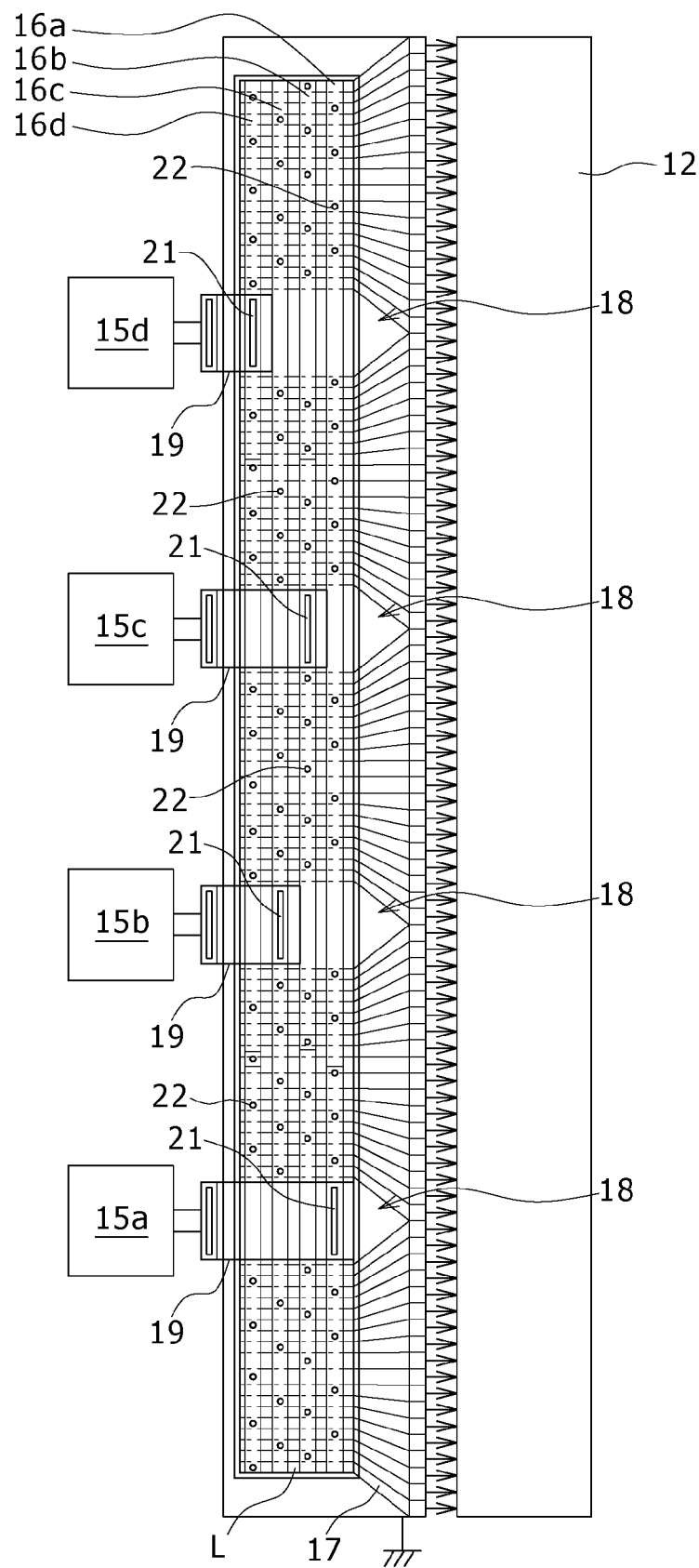
FIG. 2 is an explanatory diagram of the wiring pattern of bus lines according to the embodiment.

Specifically, as shown in FIG. 2, in the region of the contact parts L at the ends of the vertical transfer electrodes 17, blank regions 18 are formed between the respective predetermined two adjacent contact parts so that the width of each blank region 18 is larger than the distance between the respective two contact parts other than the predetermined contact parts.

Furthermore, on the blank regions 18, interconnects 19 connected to the first to fourth drive signal inputs 15a, 15b, 15c, and 15d are provided, and each of the interconnects 19 is coupled to a predetermined one of the first to fourth bus lines 16a, 16b, 16c, and 16d via a first contact 21. In FIG. 2, reference numeral 22 indicates second contacts that each interconnect the vertical transfer electrode 17 and any one of the first to fourth bus lines 16a, 16b, 16c, and 16d.

By thus providing the blank regions 18 between the respective predetermined contact parts L and interconnecting the first to fourth drive signal inputs 15a, 15b, 15c, and 15d and the first to fourth bus lines 16a, 16b, 16c, and 16d through the first contacts 21 provided on the blank regions 18, the need to provide fold-back parts like ones in existing bus lines can be eliminated. Furthermore, the first to fourth bus lines 16a, 16b, 16c, and 16d can be formed into a straight line shape and thus a small wiring area of the bus lines can be achieved, which allows size reduction of the solid-state imaging element 10. In addition, the first to fourth bus lines 16a, 16b, 16c, and 16d can be shortened correspondingly to the absence of fold-back parts. Thus, deterioration of the first to fourth vertical drive signals V$\phi$1, V$\phi$2, V$\phi$3, and V$\phi$4 occurring in the first to fourth bus lines 16a, 16b, 16c, and 16d can be prevented.

In particular, the width of the contact parts L of the vertical transfer electrodes 17 is designed to be smaller than that of the vertical transfer electrodes 17 in the pixel region 12.

This reduced width of the contact parts L allows ensuring of the area for the blank regions 18. The width of the contact parts L is adjusted depending on the area of the necessary blank regions 18.

Due to this adjustment of the width of the contact parts L, the blank regions 18 can be assured with the first to fourth bus lines 16a, 16b, 16c, and 16d being made as short as possible. Thus, deterioration of the first to fourth vertical drive signals V$\phi$1, V$\phi$2, V$\phi$3, and V$\phi$4 can be suppressed.

The arrangement of the contact parts L of the respective vertical transfer electrodes 17 is adjusted so that the blank regions 18, of which number should be four in the present embodiment, are disposed with almost equal distances therebetween.

Figure 3:
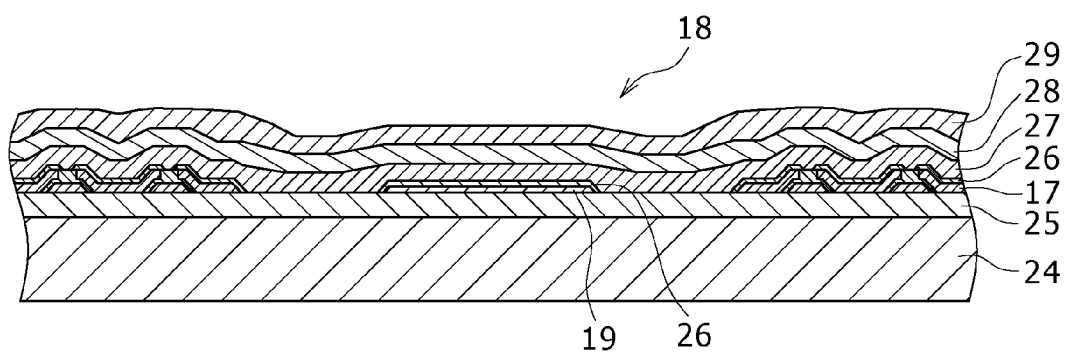
FIG. 3 is a sectional explanatory diagram of a blank region part including no planarization layer.

After the blank regions 18 have been formed in the above-described manner in association with the formation of the vertical transfer electrodes 17, a requisite semiconductor layer or insulating layer is formed on the semiconductor substrate. However, the thickness of the parts corresponding to the blank regions 18 is smaller than that of the other part by the thickness of the vertical transfer electrodes 17. Accordingly, as shown in FIG. 3, which is a sectional view of the part corresponding to the blank region 18, the height level of the upper face of the semiconductor layer or insulating layer formed on the blank region 18 is lower than that of the upper face of the semiconductor layer or insulating layer formed on the vertical transfer electrodes 17. That is, a recess exists in the entire upper face. It is known that such a recess possibly has adverse effect on formation of a semiconductor layer on the pixel region 12.

Specifically, if height unevenness such as a recess, projection or the like has occurred in the substrate surface in the vicinity of the pixel region 12, there is a possibility that unevenness of the resist thickness occurs around the recess or projection through wafer rotation at the time of resist application in a semiconductor manufacturing process. Furthermore, there is a possibility that this resist thickness unevenness causes nonuniformity in an etching step, ion implantation step, and other steps in the vicinity of the pixel region 12 and thus the characteristics of the resultant light-receiving elements 11 and transfer registers involve variation from the desired characteristics. This characteristic variation causes unevenness in imaging data. In the case of a solid-state imaging element in particular, the adverse effect of the unevenness is remarkable because the solid-state imaging element treats analog signals and final outputs therefrom are images and hence are determined through vision, which is an acute sensory system.

The multilayer structure shown in FIG. 3 includes a semiconductor substrate 24 as the base, an oxide film 25 formed on the semiconductor substrate 24, an insulating oxide film 26 provided to isolate the vertical transfer electrodes 17, an insulating film 27, an aluminum film 28 serving as a shielding film, and an upper protective film 29. In the present embodiment, the interconnects 19 are formed of a tungsten film on the oxide film 25.

In the blank regions 18, a planarization layer is provided under or over the interconnects 19 to thereby raise the height level of the top surface of the blank regions 18 so that the upper face of the semiconductor layer or insulating layer formed on the blank regions 18 is made flush with that of the semiconductor layer or insulating layer formed on the vertical transfer electrodes 17.

If the planarization layer is formed of the metal film used for the formation of the vertical transfer electrodes 17 in particular, an additional manufacturing step for forming the planarization layer does not need to be implemented. In addition, the thickness of the planarization layer can be equalized to that of the vertical transfer electrodes 17, which allows a higher planarization degree.

Figure 4:
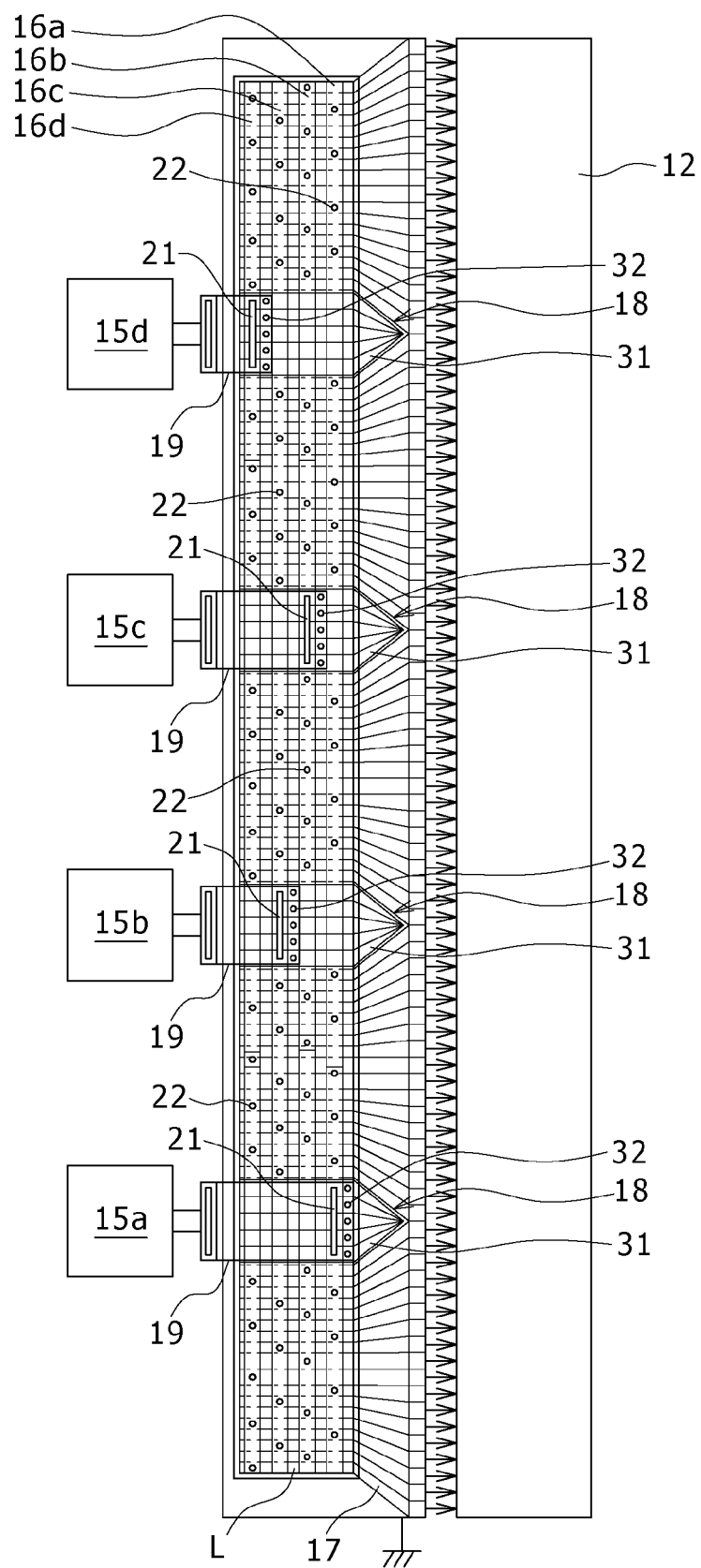
FIG. 4 is an explanatory diagram of the wiring pattern of the bus lines according to the embodiment.
Figure 5:
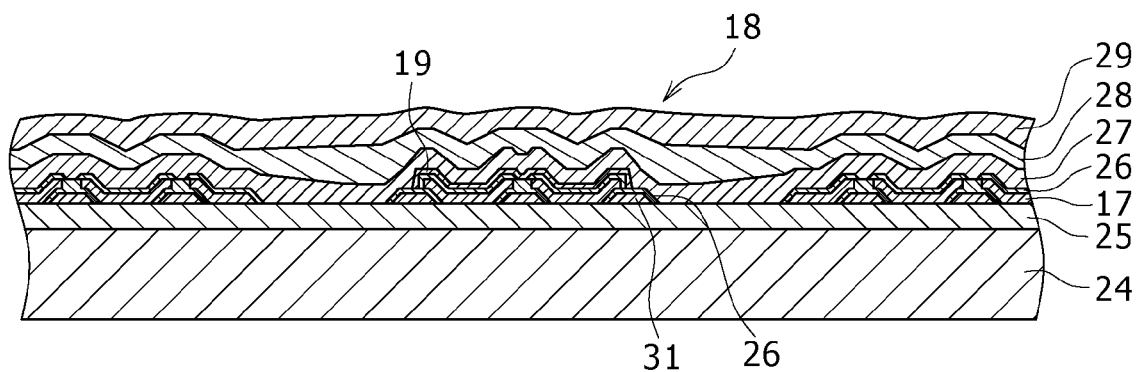
FIG. 5 is a sectional explanatory diagram of a blank region part on which dummy electrodes are provided as a planarization layer.
Figure 6:
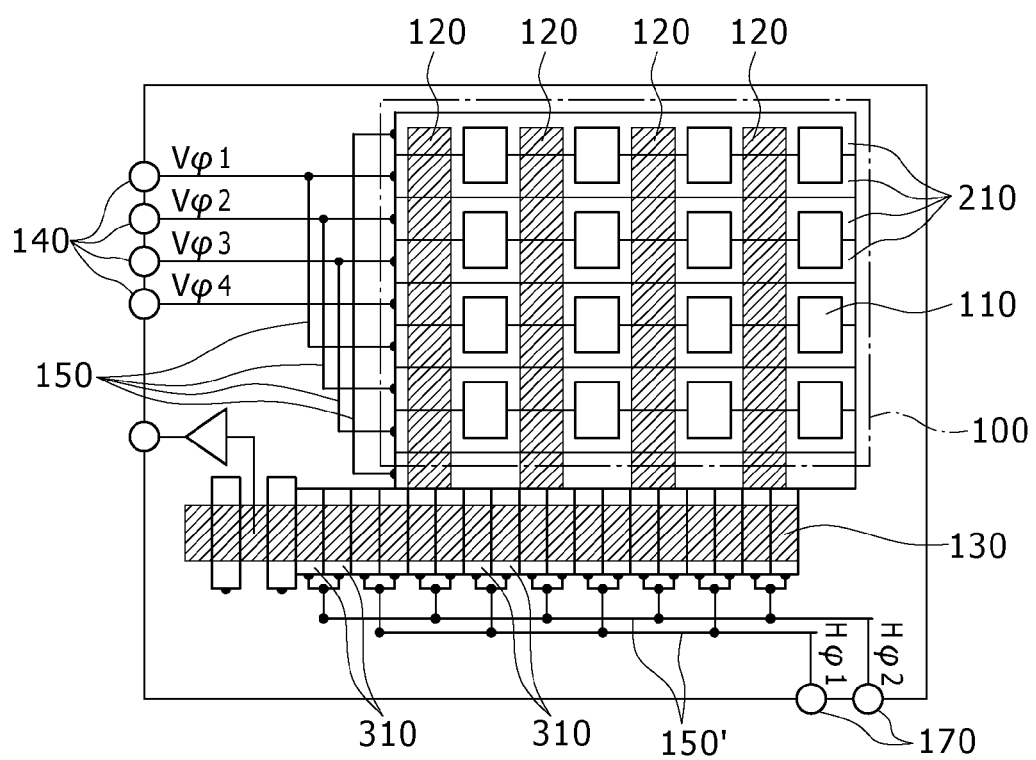
FIG. 6 is an explanatory diagram of the wiring pattern of bus lines in an existing solid-state imaging element.
Figure 7:
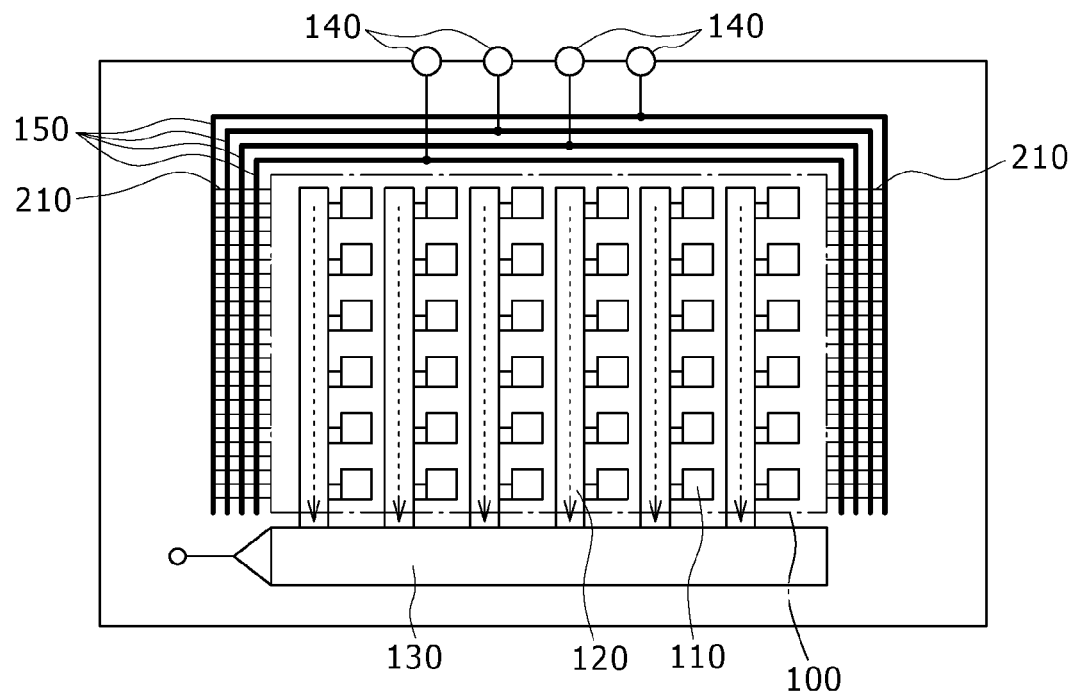
FIG. 7 is an explanatory diagram of the wiring pattern of bus lines in an existing solid-state imaging element.
Figure 8:
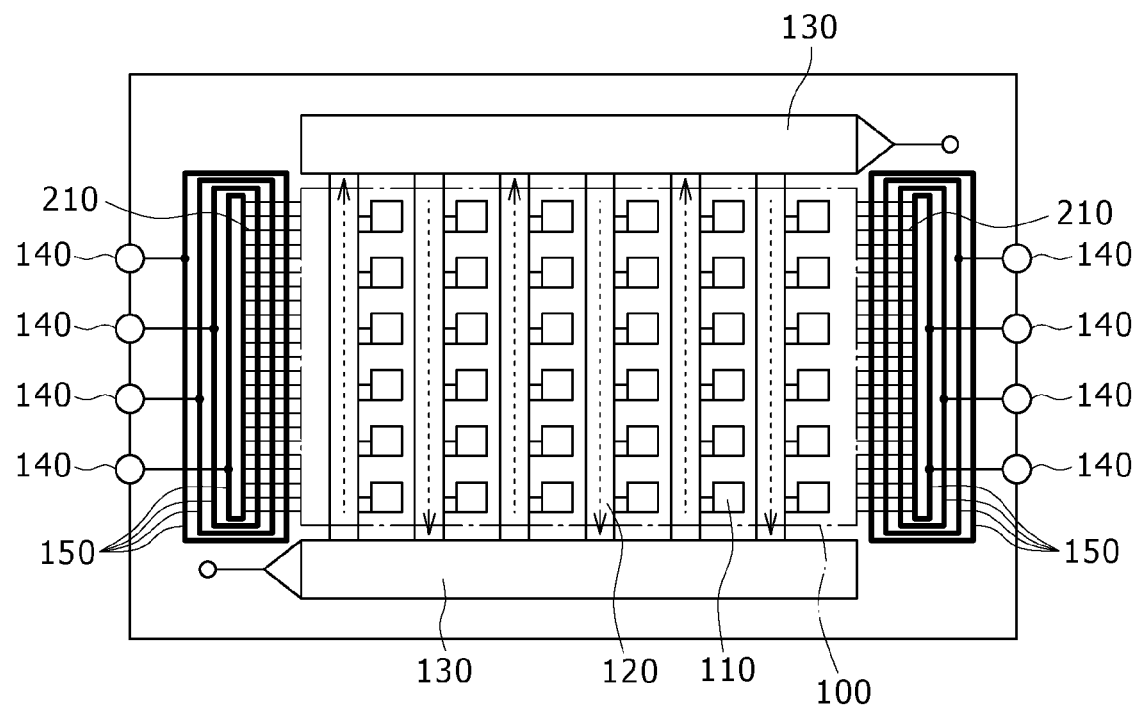
FIG. 8 is an explanatory diagram of the wiring pattern of bus lines in an existing solid-state imaging element.

Specifically, as shown in FIGS. 4 and 5, on the blank regions 18, dummy electrodes 31 are formed by use of the metal film for forming the vertical transfer electrodes 17. Due to the dummy electrodes 31, the height level of the top surface of the parts corresponding to the blank regions 18 can be raised as shown in FIG. 5, which is a sectional view of the part corresponding to the blank region 18, and therefore planarization can be achieved.

In addition, as shown in FIG. 4, the interconnects 19 are coupled to the dummy electrodes 31 via third contacts 32 so that the drive signals are input to the dummy electrodes 31. Thus, the potential of the dummy electrodes 31 can be equalized to that of the interconnects 19, and thereby the possibility of occurrence of electric short-circuit between the dummy electrodes 31 and the interconnects 19 can be eliminated, which can improve the breakdown voltage characteristic as a whole.

Furthermore, no capacitor capacitance arises between the dummy electrodes 31 and the interconnects 19, and hence the occurrence of waveform deterioration of the respective drive signals can also be prevented.

In general, an electrically floating conductive part, of which potential is uncertain, is not provided on a semiconductor substrate in terms of control stability, but the conductive part is ground in many cases. However, because the dummy electrodes 31 are not grounded but connected to the interconnects 19 as described above, the occurrence of a capacitor capacitance can be prevented.

In the above-described embodiment, the signal charge transfer direction of the first horizontal transfer register 14a is opposite to that of the second horizontal transfer register 14b. Alternatively, the signal charges may be transferred in the same direction.

The term "horizontal" of the first and second horizontal transfer registers 14a and 14b and the term "vertical" of the vertical transfer registers 13 do not limit the directions of these registers but are idiomatically used merely for the purpose of differentiation between the first and second horizontal transfer registers 14a and 14b and the vertical transfer registers 13. For example, the first and second horizontal transfer registers may be provided in parallel to the upward and downward directions in the diagrams, while the vertical transfer registers may be provided in parallel to the left and right directions in the diagrams.

In the above-described embodiment, the vertical transfer registers 13 are driven by four-phase drive signals. However, the number of phases of the drive signals is not limited to four but may be larger than four or smaller than four.

In addition, the connecting structure between the electrodes of the first and second horizontal transfer registers 14a and 14b and the bus lines for inputting drive signals to the electrodes may include blank regions, similarly to the above-described connecting structure between the vertical transfer electrodes 17 of the vertical transfer registers 13 and the bus lines.

It should be understood by those skilled in the art that various modifications, combinations, sub-combinations and alterations may occur depending on design requirements and other factor in so far as they are within the scope of the appended claims or the equivalents thereof.

What is claimed is:

1. A solid-state imaging element comprising:
   a plurality of drive signal inputs configured to be supplied with a plurality of different drive signals;
   a plurality of bus lines configured to be coupled to the drive signal inputs via a first contact; and
   a plurality of vertical transfer register electrodes configured to be coupled to the bus lines via a second contact so as to be supplied with the drive signals,
   wherein,
      a charge accumulated in light-receiving elements in a pixel region is vertically transferred by the drive signals input to the electrodes,
      each of the electrodes has a contact part connected to the second contact and having a width smaller than a width of the electrodes in the pixel region,
      a blank region between predetermined adjacent two of the contact parts has a width larger than a distance between two contact parts that are adjacent to each other, and
      the first contact is disposed on the blank region.

2. The solid-state imaging element according to claim 1, wherein
   a planarization layer having a predetermined thickness is provided on the blank region.

3. The solid-state imaging element according to claim 2, wherein
   the planarization layer is formed of a dummy electrode formed of a metal film serving as the electrodes.

4. The solid-state imaging element according to claim 3, wherein
   the drive signal is input to the dummy electrode.

5. A solid-state imaging device including a solid-state imaging element, the imaging element comprising:
   a plurality of drive signal inputs configured to be supplied with a plurality of different drive signals produced by a timing generator;
   a plurality of bus lines configured to be coupled to the drive signal inputs via a first contact; and
   a plurality of vertical transfer register electrodes configured to be coupled to the bus lines via a second contact so as to be supplied with the drive signals,
   wherein,
      in the solid-state imaging element, a charge accumulated in light-receiving elements in a pixel region is vertically transferred by the drive signals input to the electrodes,
      each of the electrodes has a contact part connected to the second contact and having a width smaller than a width of the electrodes in the pixel region, and
      a blank region between predetermined adjacent two of the contact parts has a width larger than a distance between two of the contact parts that are adjacent to each other, and
      the first contact is disposed on the blank region.

* * * * *